Figure 1:
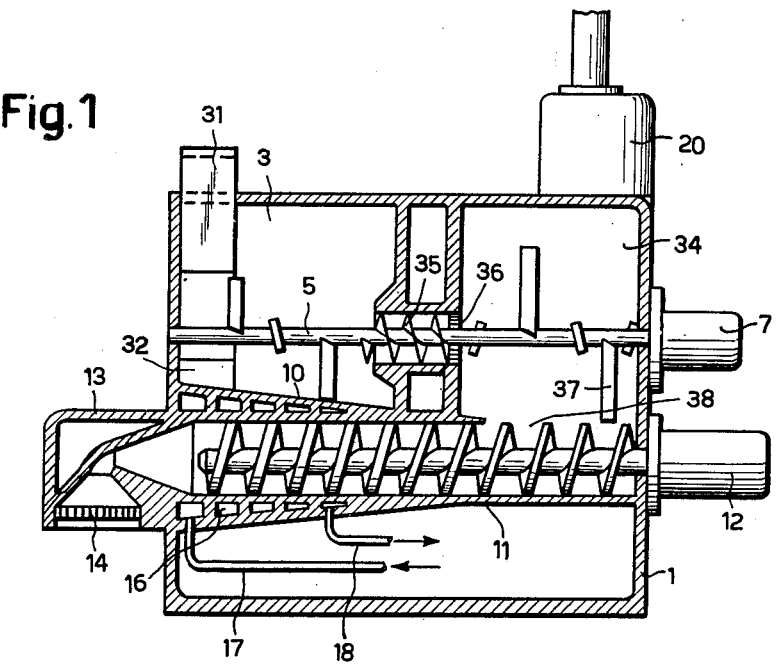

Oct. 23, 1962   G. LOCATELLI   3,059,595
FOOD-PASTE EXTRUSION PRESS
Filed Jan. 30, 1959   2 Sheets-Sheet 1

INVENTOR:
GIANLUIGI LOCATELLI
BY C. P. Goepel
his ATTORNEY

Oct. 23, 1962 G. LOCATELLI 3,059,595
FOOD-PASTE EXTRUSION PRESS
Filed Jan. 30, 1959 2 Sheets-Sheet 2
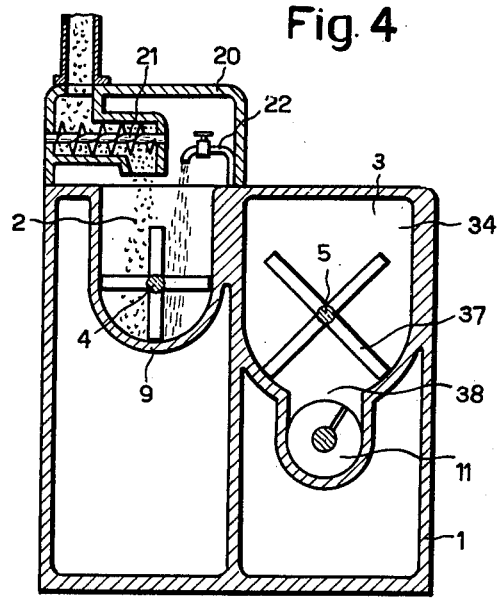
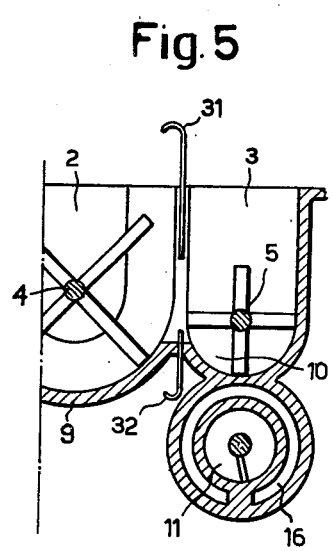
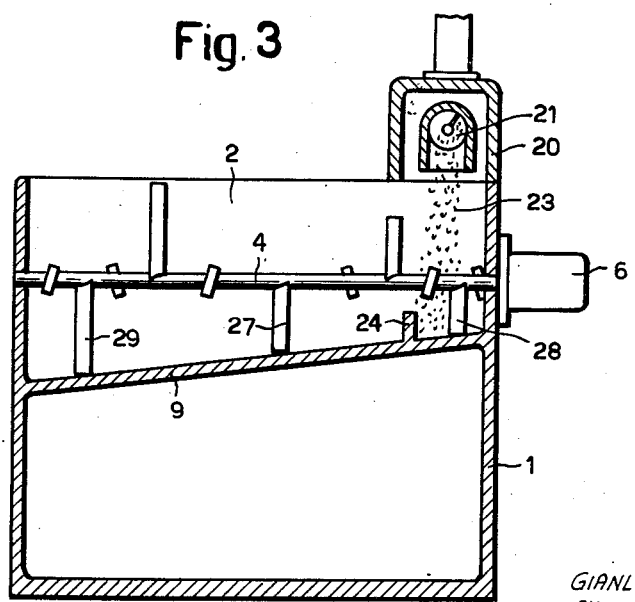
INVENTOR:
GIANLUIGI LOCATELLI
BY C. P. Goepel
his ATTORNEY

United States Patent Office 3,059,595
Patented Oct. 23, 1962

3,059,595
FOOD-PASTE EXTRUSION PRESS
Gianluigi Locatelli, Milan, Italy, assignor to Gebrueder Buehler, Uzwil, Switzerland, a Swiss firm
Filed Jan. 30, 1959, Ser. No. 790,263
Claims priority, application Switzerland Jan. 30, 1958
3 Claims. (Cl. 107—14)

My present invention relates to improvements in food-paste extrusion presses, as used for the production of spaghetti and the like, comprising a continuous mixer portion of which the axis is substantially horizontal. The present press is characterized in that the mixer is widened in the direction of movement or delivery of the goods.

Such widening feature and further developments springing therefrom afford a series of advantages. The supply of flour, middlings, water and any possible further ingredients is effected in a zone of relatively small dimensions, which fact ensures a perfect mixing operation and mixture. All of the solid particles are positively wetted uniformly before they meet, whereas in a mixing trough of relatively large dimensions the particles meet before they are contacted by water. In the latter case, solid particles cannot be wetted on their entire surface. By virtue of said enlargement, the mixer still has a sufficient volume so that the paste will remain therein reasonably long.

The paste or dough progresses uniformly on the entire mixer cross-section, i.e., the paste portions situated in the upper region of the cross-section will not proceed faster than those situated below. Tearing apart of the paste is reduced to a minimum, but nevertheless reduced dimensions of the paste portions are attained at the desired points.

The end of the pressworm may be provided with a suitable cooling system. The shape of the mixer permits of a compact construction. It is possible to control the mixing time.

Figure 2:
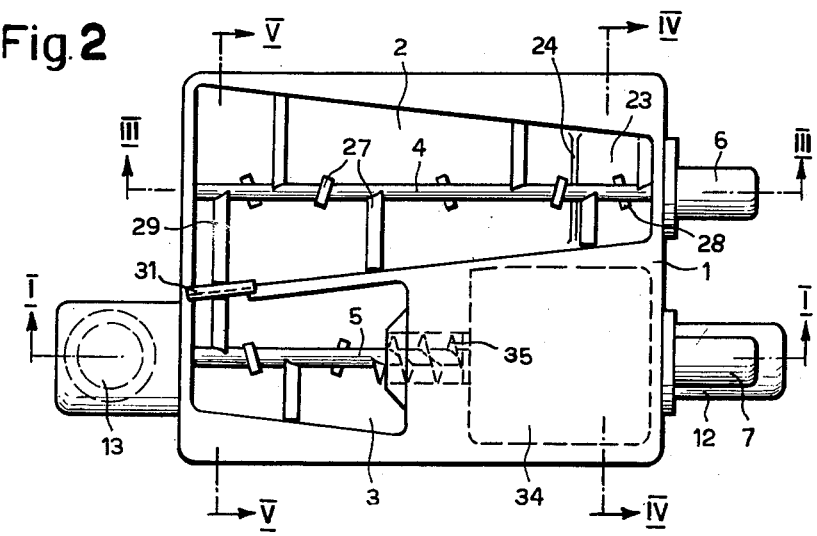

A preferred form of the invention is shown in the drawing in which:

FIG. 1 is a side view in section on the line I—I of FIG. 2; FIG. 2 is a plan view of the press with the feeding device omitted; FIG. 3 is a view in section on the line III—III of FIG. 2; and FIGS. 4 and 5 are cross-sections on the lines IV—IV and V—V respectively.

The extrusion press 1 comprises two continuous mixers 2 and 3 which are widened in the direction of movement of the goods, which are arranged side by side and operate in opposite directions. Each of the two mixers is provided with a horizontal bladed shaft 4 and 5 respectively, which are driven by motors 6 and 7. The bottoms 9, 10 of the two mixers 2, 3 are of frusto-conical shape. Below mixer 3 is disposed a press worm 11 which is driven by a motor 12 and feeds the goods towards a presshead 13 which is provided with a die 14 of known construction. Pressworm 11 is surrounded by a helical jacket 16 for a liquid cooling system. Coolant is supplied through a line 17 and is discharged through a line 18. The helical jacket 16 is conically widened.

A feeding device 20 comprising a screw conveyor 21 for the middlings and a water pipe 22 with regulable output, is disposed on the forward portion 23 of mixer 2. The bottom 9 of mixer 2 is provided with a damming or retarding sill 24.

The central portion of shaft 4 carries blades 27 which are spaced farther apart than blades 28, 29 at the ends of shaft 4. The dimensions of the passage between mixers 2 and 3 are variable by means of vertically movable partitions 31 and 32.

The portion of mixer 3 disposed above an access opening 38 to pressworm 11 is formed as a vacuum chamber 34 in which the shaft 5 carries blades 37. Chamber 34 is sealed, in known manner, by a small pressworm 35 which is fixed to shaft 4 and which feeds the paste or dough from mixer 3 into chamber 34 through a perforated plate 36. Flour, middlings, water and other ingredients pass through feeding device 20 into the forward portion 23 of mixer 2. Sill 24 prevents water from running off before it has wetted the solid particles. By reason of the relatively small dimensions of forward portion 23, a thorough mixing is ensured between the solid and the liquid particles. By reason of the enlargement of mixer 2 in the feeding direction, the volume of the mixer increases in the direction from the point where the goods are introduced into mixer 2 to the point where the goods, after mixing, are discharged. The mixer is open to the atmosphere and the goods in mixer 2, during mixing, are substantially horizontal. To fill the area of enlarging volume, the goods or paste, as it moves axially through the mixer, decreases in velocity axially of the mixer. Thus the paste can remain in the mixer for a reasonable time. As the blades 27 are spaced at a relatively great distance from each other and are only slightly inclined, the paste or dough is not worked excessively. By virtue of this slight inclination, further, the paste portions situated above are moved only slowly, i.e., not faster than the paste portions situated below. The rate of feed thus is uniform, and the quality of the goods remains constant. The blades 29, of which the spacing is less than that of the blades 27, reduce the dimensions of the paste portions which cannot be larger than the cross-section left free between the partitions 31, 32. When raising the sliding partition 32, the time of stay of the paste in mixer 2 is increased. The paste moving from mixer 3 into the chamber 34 drops readily through the opening 38 into the pressworm 11 of which the feed does not present any difficulties. The widening shape of the helical cooling jacket 16 causes a more pronounced cooling effect at the end of pressworm 11, i.e. at the point where the pressure and the temperature rise are highest.

I claim:
1. A food paste extrusion press and a mixer for receiving ingredients at one of its ends and for mixing said ingredients and feeding said mixed ingredients to said press, said mixer being gradually enlarged in the direction from said end where said ingredients are received by said mixer toward the point where said mixed ingredients are fed to said press, said mixer having a shaft extending substantially horizontally through said mixer, a plurality of axially spaced blades on said shaft, the spacing of said blades on said shaft intermediate the ends of said mixer being greater than the spacing of said blades on said shaft at the opposite ends of said mixer.

2. A food paste extrusion press and a mixer for receiving ingredients at one of its ends and for mixing said ingredients and feeding said mixed ingredients to said press, said mixer including a mixing chamber, a horizontal shaft in said chamber and mixing blades extending outwardly from said shaft at spaced points therealong, said mixing chamber being gradually enlarged in the direction from said end where said ingredients are received by said mixer toward the point where said mixed ingredients are fed to said press, said mixer having a damming sill on the bottom of said mixer adjacent said one end of said mixer where said ingredients are received therein.

3. A food paste extrusion press and a mixer for receiving ingredients at one of its ends and for mixing said ingredients and feeding said mixed ingredients to said press, said mixer including a mixing chamber, a horizontal shaft in said chamber and mixing blades extending outwardly from said shaft at spaced points therealong, said mixing chamber being gradually enlarged in the direction from said end where said ingredients are received by said mixer toward the point where said mixed ingredients are fed to said press, said press including a press worm below said mixer, a housing for said press worm, a coolant jacket in said housing, means for delivering mixed ingredients from said mixer to said press worm, said press worm being adapted to receive said mixed ingredients from said mixer and move said ingredients in an opposite direction, said coolant jacket in said housing widening in the direction of movement of said ingredients through said worm.

References Cited in the file of this patent

UNITED STATES PATENTS

| | | |
|---|---|---|
| 617,866 | Somasco | Jan. 17, 1899 |
| 1,471,697 | Kubes | Oct. 23, 1923 |
| 1,866,031 | Green | July 5, 1932 |
| 2,087,492 | Williams | July 20, 1937 |
| 2,531,224 | Lenner | Nov. 21, 1950 |
| 2,640,033 | Marshall | May 26, 1953 |
| 2,792,304 | Pavan | May 14, 1957 |
| 2,868,143 | Strahamm | Jan. 13, 1959 |
| 2,868,144 | Ambrette | Jan. 13, 1959 |
| 2,926,619 | Kruder | Mar. 1, 1960 |

FOREIGN PATENTS

| | | |
|---|---|---|
| 778 | Great Britain | Mar. 28, 1861 |
| 407,365 | Italy | Oct. 3, 1944 |
| 474,399 | Italy | Sept. 22, 1952 |
| 478,462 | Italy | Feb. 23, 1953 |